Patent 3,015,367

3,015,367
FILTRATION MEDIA
Stanton B. Smith and Arvo J. Juhola, Pittsburgh, Pa., assignors, by mesne assignments, to Pittsburgh Chemical Company, Pittsburgh, Pa., a corporation of Pennsylvania
No Drawing. Filed July 19, 1955, Ser. No. 523,100
4 Claims. (Cl. 183—4)

The present invention is concerned with aerosol filtration media and is related to our application Serial No. 425,720, filed on April 26, 1954, now Patent No. 2,882,997.

It is an object of this invention to form filtration media in fabric form having high stopping power for liquid smokes and fine dusts, high air permeability and good wet and dry mechanical strength.

It is a further object to prepare such media affording protection against gases, vapors and/or odors by virtue of its adsorptive, chemical and/or catalytic properties.

Another object of the present invention is to prepare a fibrous filter containing activated carbon which can be used in the air conditioning field on a throw-away basis.

A still further object is to secure increased retention of the carbon particles on the fibrous material by means of an adhesive.

Still further objects and the entire scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

The objects of this invention may be obtained in several ways.

Thus a dry, pulverized impregnite of adsorbent, chemical or catalytic nature, preferably active carbon is fed to the air stream during air deposition of a fiber web of inert and heat sealing fibers. The fibers optionally and preferably can also contain a filtering agent such as asbestos or glass wool fibers. The asbestos fiber for example aids in the retention of the carbon in the web. The web can be made for example by feeding the fibers from a card or waste machine to a random air deposition machine such as the Rando-Feeder and the Rando-Webber combination (manufactured by Curlator Corporation, Rochester, N.Y.). This machine is capable of dispersing the fibers separately in a high velocity air stream and depositing them on a screen until a layer of desired depth, e.g., 2 to 50 mm. is built up. The screen may be continuously moving so as to produce a randomly oriented web by a continuous process.

Fibers as short as 0.25 inch can be used with this machine.

The ratio of inert to heat sealing fibers can be from 25:75 to 75:25 and, in some instances, the inert fiber can be omitted completely, although, such is not normally preferred. If desired, surface layers can be provided composed exclusively of inert fibers together with an intermediate layer containing the heat sealing fibers and the pulverized impregnite.

When asbestos or glass fibers are present for filtration purposes, the normal range of proportions is 5 to 60% asbestos, such as Canadian Chrysotile Grade 3F, 20 to 50% heat bonding staple fiber and 0 to 75%, preferably at least 10%, inert staple fiber. Preferably 14 to 21, e.g., 17%, of glass fibers are employed.

As examples of satisfactory heat bonding staple fibers, there can be used vinyl chloride-acetate copolymers with the vinyl chloride in excess, such as Vinyon HH, vinylidene chloride polymers, such as Saran and acrylonitrile resins. Materials of the type of Vinyon HH have been found superior to any other heat bonding fibers tested. Heavily plasticized polymers should be avoided, as they will poison the carbon when heated.

As inert staple fibers, we can use cellulosic materials, such as viscose rayon, comber cotton and cotton thread waste.

When impregnite loads up to 50%, e.g., 5% or 25%, of the total weight of the impregnated pad are sufficient, no additional binder is necessary and an adsorbent or chemical pad can be made (1) by heat pressing the pad containing heat bonding fibers in conventional manner between smooth heated platens or rolls or (2) by heat pressing the pad between studded or gridded platens or rolls to heat bond firmly in a definite geometric pattern in order to impart strength and rigidity while sealing either partially or not at all in the spaces between the spots or lines or (3) by heat pressing, using a combination of procedures (1) and (2) to give a controlled density and strength.

In using carbon in such a procedure with loading up to 50% of the carbon, it is possible to use fine particle size, e.g., as much as 50% of the carbon being of 325 mesh or finer.

When it is desired to make higher loadings, i.e., over about 50%, e.g., 70% or 80%, of the impregnite, they can be obtained without serious loss in permeability, by using one or preferably both of the following modifications of the above outlined procedure. The impregnite particles used are coarser, e.g., carbon from plus 200 mesh to minus 30 mesh can be used. To obtain pads with a 10 mm. cyanogen chloride life, at least about 30 oz./yd. of ASC Whetlerite carbon is necessary. Alternately, an additional adhesive can be used to bind the impregnite particles to the fibers.

Important considerations in the use of an adhesive are the prevention of poisoning of the impregnite by vapors or enclosure of the external particle surface and the lowering of filtration efficiency of fine-fibered filtration agents by matting together of the individual fibers. Undue compression of the web, while the fibers are sticky, is to be avoided, so that the permeability will not be reduced.

Certain impregnites, such as activated carbon and Whetlerite carbons, are sensitive to organic solvent vapors and it is advisable in such cases to apply the adhesive in the form of a water emulsion or solution by either (a) dipping or (b) spraying directly onto a thin web or (c) spraying a mist of emulsion into the air stream of the air deposition machine. The resulting dampened webs must be thoroughly dried and devolatilized if they originally contain significant amounts of solvent. On the other hand, if an adhesive is employed, it should be of such a nature that the film remains tacky after solvent has been removed. If the adhesive solution contains only materials of high molecular weight, incapable of appreciable diffusion into the impregnite, then the impregnite may be added while the coat is still damp. However, in the preferred procedure, the impregnite is added after drying.

The choice of adhesive will naturally depend upon the conditions of use. Where water contact is not expected, the adhesive can be a stiffening or sizing agent, such as starch or its derivatives, including dextrin, soluble gums, such as tragacanth and karaya, etc. In other cases plastic emulsions such as those containing vinyl resins, e.g., polyvinyl acetate, polyvinyl alcohol and other polymers can be used. When flexibility is desired it is possible to use natural or synthetic rubber (e.g., butadiene-styrene copolymer) latex.

As preferred adhesives it is possible to use polyvinyl alkyl ethers which are both permanently tacky and flexible. For example water soluble members of the class can be used such as polyvinyl methyl ether or emulsions of the water insoluble members such as polyvinyl ethyl ether or its propyl or butyl etc. homologues can be used. An especially preferred material is polyvinyl ethyl ether.

The adsorbent may be applied in several different ways:

(1) Pulverized adsorbent, either coarsely or finely ground is forced onto the coated fiber by an air blast, (2) The pulverized adsorbent is sifted onto the web produced from a carding machine or air deposition device and vibrated down into the web structure.

(3) In a preferred manner to improve impregnite distribution, the coated fiber, either with or without adhering impregnite, is redispersed in an air deposition apparatus. Advantageously additional impregnite is fed into the air stream, (4) The web is fed to the air disposition machine dry and uncoated while the adhesive emulsion is dispersed as a mist in the dispersing air stream. Either concurrently or during a second pass of the dried, coated fiber through the air deposition machine, the impregnite is added to the air stream, depending upon the compatibility of impregnite and adhesive used.

(5) The above methods of fixation of impregnite can also be applied to pulverized filtering agents, such as hammermilled asbestos or finely divided ultra-fine glass or synthetic resin fibers, e.g., Vinyon HH. It is possible to use a mixture of carbon and finely divided asbestos, e.g., a 70:30 carbon to asbestos mixture.

(6) It is also possible to partially fix finely ground impregnites, such as carbon, by a thorough blending of the impregnite with finely divided short fiber filtering agents, such as the asbestos mentioned in 5. The mixture is fed into the dispersing air stream of the deposition machine concurrently with the laying down of the long fiber mat, thus enmeshing the short fiber with the long and obviating the need for an adhesive coat in addition to the heat bonding resin fibers, and (7) If the impregnite is compatible with water or solvent, it can be added to the fiber web in slurry form containing binding resins, e.g., water dispersible urea formaldehyde thermosetting resin or adhesives, such as those previously mentioned by spraying or dipping or any of the methods outlined above.

Webs containing impregnite, with or without filtering agents, prepared by any of the methods outlined immediately above, can be treated to form the finished material by appropriate heat pressing, as indicated previously. The temperature should be high enough to soften the heat bonding material, but not so high that it will decompose. The pressure also should be regulated so that too dense a pad is not obtained. Pressure of about 10 to 50, e.g., 40 lbs./sq. inch, applied for about 0.5 to 5, e.g., one minute, normally is adequate. With Vinyon HH, a temperature of 90° C. or 180° C. is adequate.

Layers of any of the webs described above can be superimposed and heat pressed between smooth rolls or platens or spot or line-sealed in geometric patterns.

Spot sealing can be done at regularly spaced intervals, preferably 3 mm., with partial sealing between these points to produce a satisfactory adsorbent fabric filter. This technique produces a more rugged and uniform material with controlled density throughout the pad. No lateral shifting of layers is possible and "piping" or expansion of the thickness on bending is greatly diminished by the sealed spots. This results in much more effective carbon fixation by reduction of the motion of fibers with respect to one another inside the pad.

If the webs have good aerosol filtration power, they can be faced on one side or both with non-impregnated webs, either presealed by heat and pressure or heat sealed concurrently with the impregnated web or webs.

The impregnated webs can be faced with filtration layers, containing asbestos for example, as disclosed in my aforementioned application on either one or both sides. The filtration layers can be prepressed to a controlled density or they can be pressed simultaneously with the impregnated web. If desired facings of smooth heat sealed webs, gauze or fabrics, dyed or not, can be used on one or both surfaces. Such facing layers may be attached to the impregnated webs by spot sealing if desired.

Facing layers of filtering or non-filtering nature can be laminated with adsorbent layers using spray applied or roll coated application of adhesives if such coatings are compatible with the impregnite and do not form impervious coatings.

If desired special surface properties such as water repellancy, scuff resistance, etc. can be imparted to the facing layers by pretreatment of the surface webs before assembly of the composite pads or may be spray applied or roll coated onto the finished material and dried thereon as a final step. Such materials should be applied in such a form that permeability, filtration, and impregnite are not impaired by the treatment to a substantial degree.

In a preferred method of operation top and bottom surface layers composed of cotton fibers (75%) and Vinyon HH fibers (25%) are provided along with an intermediate layer composed of long fiber asbestos (50%) and long staple Vinyon (50%) together with coarse-ground (minus 30 mesh) Whetlerite activated carbon. The carbon is present in an amount of 60% of the total weight of the intermediate layer. Preferably the carbon is bonded to the fibers by the addition of a small amount of an adhesive such as polyvinyl ethyl ether emulsion. The stiffness of the product can be controlled by the quantity of thermoplastic Vinyon HH incorporated while the adsorptive capacity is controlled by the quantity of activated carbon.

To provide protection against non-persistent gases such as cyanogen chloride the Whetlerite carbon is impregnated with metallic salts such as copper sulfate, silver nitrate, etc. The exposed layers can be spray coated with a paraffin emulsion when water repellancy is required.

As an alternative preferred procedure the two outer surface layers are made up of Webril R, a cotton felt made by caustic treatment of cotton staple fiber. No thermoplastic binder is present in these layers. The intermediate layer is made of staple fibers of viscose (75%) and Vinyon HH (25%) with a mixture of fine grounds ASC carbon (through 325 mesh) and hammermilled asbestos fibers. The preferred carbon to asbestos ratio is 2.8 to 1 and the combined weight of asbestos and carbon is about 50% of the total weight of this layer.

The function of the asbestos in both materials referred to above is to provide filtration efficiency for ultra-fine particulate matter. It is effective on liquid smokes, such as dioctyl phthalate (DOP) of particle diameters in the range of 0.3 micron. The extremely fine diameter of the asbestos fibers permits a high degree of filtration with a minimum of resistance to air flow. In addition to the filtration function, the asbestos fibers serve to enmesh the particles of carbon so as to give high retention for the carbon.

The present invention is also of particular use in the air conditioning field where it has long been the practice to use activated carbon for odor removal. By the present invention it is possible to use the carbon in conjunction with fibrous filter materials to effect both odor and dust removal simultaneously. Previously the functions have been kept separate, the carbon in coarse granular form being placed in axial-flow canisters of perforated metal or between rigid corrugated screens or perforated sheets. Because of the high grade of carbon required for this type of installation it was economically imperative to re-activate the carbon or at least replace the carbon even though this is an involved and expensive operation. The space requirements for such units also is great as the pressure drop in a closely packed bed is so great that in order to obtain adequate performance within a conventional air flow resistance specification it is necessary to use a thin bed of 1 to 2 cm. with a consequent large bed area requiring staggering or angular arrangements of filter banks in air ducts.

However, by employing the teachings of the present invention it is possible to use carbon in a sufficiently cheap form to operate on a throw-away basis. Such materials are readily available, e.g., carbon of relatively low activity or carbon of a broad particle size range but still fine enough to go through a 30 mesh sieve.

In order to obtain physical support and low resistance to air flow together with retention of fines, the carbon particles can be bound with an adhesive of the type previously indicated (preferably a polyvinyl alkyl ether such as polyvinyl ethyl ether), to individual fibers such as glass filaments and synthetic and natural fibers of the class previously mentioned. The adhesive can be added to the fibers as a coating which can be hardened to produce a stiff but very open web. Such stiffening or sizing agent should hold the fibers together and also act as an adhesive to retain the carbon.

Tacky film forming adhesives such as the polyvinyl alkyl ethers also serve to trap dust particles in a manner similar to current commercial filters of the throw-away type. So long as the carbon particles are not completely covered a certain amount of dust buildup with the attendant dual function of the polyvinyl alkyl ether is permissible.

By the use of such a material sufficient carbon can be interposed in the air stream without creating excessive air resistance so that high air velocities are practical, thus permitting the use of a single vertical panel in a duct or insertion of such units into conventional dust filter frames thus reducing the space requirements for odor removal units considerably.

Where simultaneous dust removal is desired it can also be obtained in one of the following ways:

(1) Adhesives or dust retaining oils can be sprayed onto the influent face of the adsorbent filter with the spraying so regulated that penetration is not carried far enough to inactivate an excessive amount of the carbon.

(2) A separate coated fiber layer can be used ahead of the carbon filter. Optionally the coated fiber layer can be bonded to the carbon layer.

(3) In addition to the carbon layer, there can be used an additional layer of a filter containing asbestos fibers capable of trapping fine aerosol particles, said additional layer being described more fully in my aforementioned copending application.

The materials of the present invention can be made by applying carbon suspended in an air stream or sprinkled evenly onto a supported card web previously coated with an adhesive either by spraying or immersion. Before drying the required number of layers of such material can be built up so as to harden on drying into a finished rigid bat.

Carbon and fiber can be laid up into the web simultaneously by air deposition as in the Rando-Webber machine.

The carbon used can be impregnated in any conventional manner to impart catalytic or other chemical properties. ASC Whetlerite carbon can be used for toxic gas protection or the carbon can be impregnated with bromine to adsorb ethylene or mercury vapor. For protection against non-persistent gases such as cyanogen chloride the Whetlerite carbon is impregnated with metallic salts of copper, chromium and silver, e.g., copper sulfate, chromium chloride and silver nitrate.

It is an essential feature of this phase of the invention that a binder can be used on activated carbon which can be applied wet, a fact not previously recognized, provided the binder is of such a nature that it does not render the carbon non-adsorbent either by covering its internal surface or by completely enclosing the carbon particles with an impervious coating. This result can be accomplished as long as volatile organic solvents and other volatile materials other than water and ammonia are absent from the adhesive binder solution and all dissolved solids are of high molecular weight or the coating conditions are such that smaller dissolved molecules cannot diffuse into the carbon particles. Organic solvent, free water emulsions of vinyl resins and natural and synthetic rubber latices can be applied by spray and allowed to contact the carbon while wet without deactivating the adsorbent to an appreciable degree.

A more complete understanding of this invention and the operation thereof may be had by reference to the following illustrative examples of actual operation in accordance with the invention.

EXAMPLE 1

Two filtration layers containing asbestos were superimposed on a composite layer of thermoplastic and inert fibers to which were attached with adhesive 100 x 200 mesh particles of ASC Whetlerite carbon to impart adsorbent and catalytic properties to the finished pad.

*Filtration layers*

Five inch diameter circles were cut from a web containing 50% 3F Canadian Chrysotile Asbestos, 25% Vinyon HH, 3 denier 1 inch staple and 25% viscose rayon, crimped, 3 denier, and 1 9/16 inch staple. The web weighed 38 oz./sq. yd. The web was prepared by two passes of the staple fiber through a two-stage Kirkman and Dixon Waste Machine followed by one pass through the Rando-Feeder and Rando-Webber in combination.

The two filter layers were made up of one and two web thicknesses respectively by heat-pressing in a cylindrical mold with smooth faces at a temperature of 120 degrees C. with a preheat period of 5 min. Only slight pressure was applied and spacers were used to give a thickness of 1.5 mm. and 2.4 mm. respectively to the filter layers in the mold.

*Adsorbent layer*

Six and one-half five inch diameter circles were used to make this layer. The circles were made up of 50% Vinyon HH and 50% comber cotton waste. The webs were prepared in the same manner as the filtration layers.

After preparation of the webs the circles were sprayed with an adhesive emulsion containing polyvinyl ethyl ether (grade EXBP of the Bakelite Corporation), triethanolamine, Atlas emulsifier, e.g., sorbitan monolaurate and water.

Alternately, as the adhesive emulsion, the following preparation was used:

| | |
|---|---|
| Casein | 7 grams. |
| Water | 70 ml. |
| Ammonia (14% solution) | 4 ml. |
| Aerosol OT (sodium dioctyl sulfo succinate) | 0.84 g. in 70 ml. water. |
| Polyvinyl ethyl ether (EXBJ grade) | 0.50 g. |

(Dissolved in 150 ml. of petroleum ether.)

The solvent for the polyvinyl ethyl ether was evaporated off before use and the emulsion was diluted 1:1 with water to give a stable emulsion.

Following the spraying with either of the above emulsions, the pads were placed in a vacuum drying oven for one hour at 108° C. and withdrawn with a permanently tacky vapor-free coating.

ASC Whetlerite carbon 100 x 200 mesh was sifted onto the pads and worked into the surface and the excess which did not adhere was shaken off. A total of 10 grams adhered to the fibers of the pads.

The impregnated pads were placed in the press mold between the filtration layers, using studded mold faces with directly opposing projections protruding 2 mm. from the faces and spaced at ¾ inch intervals. The pads were preheated 5 minutes and pressed at 40 p.s.i. momentarily at 116° C. and released.

*Properties of the product*

The finished pad, when tested with a 0.3 micron dioctyl phthalate smoke, showed a 0.031% penetration at 3.2 meter/minute linear velocity. The Chemical Corps specification is not over 0.04% penetration under these conditions.

The pressure drop across the pad under the smoke test was 56 mm. of water. The maximum permissible by the Chemical Corps specification is 65 mm.

The pad had a cyanogen chloride gas life (2 mg./l., 1 m./min. vel.) of 17.5 min., in contrast to the Chemical Corps specification minimum of 10 min.

EXAMPLE 2

In this example, the outer layers were composed of 50% comber cotton and 50% Vinyon HH. The intermediate layer contained 0.8 g. of fiber V (polyethylene terephthalate), 4.1 g. of Johns-Manville asbestos No. 201, 4 g. of Vinyon HH and 13 g. of ASC carbon (50 x 100). The fiber V was sprayed with a 10% natural rubber latex and dried. Then, the web was prepared as in Example 1 and the carbon sifted onto the web. The product was spot sealed at a momentary pressure of 40 p.s.i., applied after preheating for 10 min. at 120° C. The product had a DOP penetration of 0.016%, a change in water pressure of 57 mm. and a cyanogen chloride life of 19.1 min.

EXAMPLE 3

In this example, a mixture of 0.75 g. of Arizona Chrysotile asbestos in finely divided hammermilled form and 2 g. of finely divided cotton flock along with 10 g. of Whetlerized carbon (18% 50 x 100 mesh, 25% 100 x 200 mesh, 17% 200 x 325 mesh, balance through 325 mesh), were mixed with 6.5 g. of a fibrous mixture of 50% each of comber cotton waste and Vinyon HH in the Webber machine. Slight pressure was used after a preheat time of 10 min. at 120° C. The product was 8.5 mm. thick and had a DOP value of 0.04%, a water pressure drop of 58 mm. and a cyanogen chloride life of 13 minutes.

EXAMPLE 4

A product was prepared in which the outer layers were made up of a mixture of 50% comber cotton and 50% Vinyon HH. The intermediate layer which was twelve times as thick as each outer layer was composed of 25% Vinyon HH, 25% Viscose and 50% of a ground carbon Arizona Chrysotile asbestos mixture having a carbon to asbestos ratio of about 2.8:1. The layers were prepared in the manner previously indicated on the Rando-Webber and then, after the top and bottom layer were superimposed on the intermediate layer, the product was molded at 40 p.s.i. after a 10 min. preheat at 120° C. The final product had a thickness of 8.5 mm. and was waterproofed with a 10% paraffin emulsion. The product showed a 0.01% DOP penetration, a water pressure drop of 53 mm. and a cyanogen chloride time of 24 min.

EXAMPLE 5

In this example, the outer layers were made up of 50% colored cotton thread waste and 50% Vinyon HH. The intermediate layer which was fifteen times as thick as each outer layer was composed of a mixture of 31% Vinyon HH previously tackified with polyvinyl ethyl ether, 31% viscose rayon and 38% of a mixture of Whetlerized carbon smaller than 325 mesh and Arizona Chrysotile asbestos also finely ground in the ratio of 70% carbon to 30% asbestos.

The polyvinyl ethyl ether was applied to the Vinyon HH from the second emulsion referred to in Example 1 and the Vinyon HH fibers were thoroughly dried before mixing with the other materials in the intermediate layer to form the web on the Rando-Webber. The product was spot sealed under 40 p.s.i. for 15 sec. after a preheating for 10 min. at 120° C. The resulting laminated pad was 9 mm. thick and had a DOP penetration of 0.006%, a water pressure drop of 56 mm. and a cyanogen chloride life of 26 min.

EXAMPLE 6

A product was prepared in which the outer layers were made up of a mixture of 50% comber cotton and 50% Vinyon HH. The intermediate layer contained 4 g. of AAA fiber glass and 6 g. of cotton flock which had been milled together and this mixture was blended in Rando-Webber (air former) with 6 g. of cotton staple fiber, 6 g. of Vinyon HH and 13 g. of ASC carbon (50 x 100). The product was deposited as a 5 inch diameter circle and then pressed for 5 min. at 160° C. at 40 p.s.i.

We claim:

1. A laminated article containing three layers, the outer layers being a mixture of staple cotton and vinyl chloride-acetate polymer fibers, and the intermediate layer being a mixture comprising long fiber asbestos, long staple vinyl chloride-acetate polymer fiber and particulate activated carbon.

2. A laminated article containing three layers, the outer layers being composed of caustic treated cotton staple fibers, and the intermediate layer comprising staple viscose fibers and staple vinyl chloride-acetate polymer fibers and a mixture of particulate activated carbon and ground asbestos.

3. A laminated article containing three layers, the outer layers being a mixture of staple cotton and vinyl chloride-acetate polymer fibers, and the intermediate layer being a mixture comprising glass fibers, long staple vinyl chloride-acetate polymer fiber and particulate activated carbon.

4. A laminated article according to claim 3, wherein a rubber latex adhesive is also present to bond the carbon to the fibers.

References Cited in the file of this patent

UNITED STATES PATENTS

| | | |
|---|---|---|
| 2,411,660 | Manning | Nov. 26, 1946 |
| 2,521,985 | Lang et al. | Sept. 12, 1950 |
| 2,579,984 | Trowbridge | Dec. 25, 1951 |
| 2,582,915 | Sebok | Jan. 15, 1952 |
| 2,587,234 | Sebok et al. | Feb. 26, 1952 |